(12) United States Patent
Kurittu

(10) Patent No.: US 8,209,187 B2
(45) Date of Patent: Jun. 26, 2012

(54) SPEECH CODING ARRANGEMENT FOR COMMUNICATION NETWORKS

(75) Inventor: Antti Kurittu, Vantaa (FI)

(73) Assignee: Nokia Corporation, Espoo (FI)

( * ) Notice: Subject to any disclaimer, the term of this patent is extended or adjusted under 35 U.S.C. 154(b) by 1275 days.

(21) Appl. No.: 11/634,420

(22) Filed: Dec. 5, 2006

(65) Prior Publication Data

US 2008/0133247 A1    Jun. 5, 2008

(51) Int. Cl.
G10L 19/00    (2006.01)

(52) U.S. Cl. ........ 704/500; 704/501; 455/453; 455/423; 370/342; 370/252

(58) Field of Classification Search .......... 704/500–504, 704/201; 455/563, 423, 453; 370/342, 252
See application file for complete search history.

(56) References Cited

U.S. PATENT DOCUMENTS

| | | | | |
|---|---|---|---|---|
| 5,475,686 | A | | 12/1995 | Bach et al. ........................ 370/84 |
| 6,108,560 | A | * | 8/2000 | Navaro et al. .................. 455/517 |
| 6,172,974 | B1 | * | 1/2001 | Tseng et al. .................... 370/357 |
| 6,349,197 | B1 | * | 2/2002 | Oestreich ....................... 455/63.1 |
| 6,961,377 | B2 | * | 11/2005 | Kingsley .................... 375/240.12 |
| 7,016,834 | B1 | * | 3/2006 | Lakaniemi ..................... 704/214 |
| 2001/0006895 | A1 | * | 7/2001 | Della Mea .................... 455/453 |
| 2001/0044712 | A1 | * | 11/2001 | Vainio et al. ................... 704/201 |
| 2002/0015442 | A1 | | 2/2002 | Takeuchi et al. ............... 375/211 |
| 2002/0101844 | A1 | * | 8/2002 | El-Maleh et al. .............. 370/342 |
| 2003/0032440 | A1 | * | 2/2003 | Sato et al. ...................... 455/517 |
| 2003/0065508 | A1 | * | 4/2003 | Tsuchinaga et al. ........... 704/215 |
| 2004/0019480 | A1 | | 1/2004 | Sato et al. ...................... 704/201 |
| 2004/0081100 | A1 | * | 4/2004 | El-Maleh et al. .............. 370/252 |
| 2004/0110539 | A1 | | 6/2004 | El-Maleh et al. .............. 455/563 |
| 2004/0196900 | A1 | * | 10/2004 | Lim et al. ....................... 375/240 |
| 2004/0243404 | A1 | * | 12/2004 | Cezanne et al. ................ 704/225 |
| 2004/0267519 | A1 | * | 12/2004 | Sjoberg et al. ................. 704/201 |
| 2006/0100859 | A1 | * | 5/2006 | Jelinek et al. .................. 704/201 |

OTHER PUBLICATIONS $3^{rd}$ Generation Partnership Project; Technical Specification Group Services and System Aspects; Inband Tandem Free Operation (TFO) of speech codecs; Service description; Stage 3 (Release 6), 3GPP TS 28.062 V6.2.0 (Dec. 2005) Section 4: General Description, pp. 1-20, whole document.

* cited by examiner

*Primary Examiner* — Jialong He

(74) *Attorney, Agent, or Firm* — Harrington & Smith

(57) ABSTRACT

Disclosed is a method in a network element of a communication network, which communication network is capable of transparently transferring coded data at least in some part of the communication network. The method includes detecting a need to change codec rate to a second codec rate in a downlink connection from the communication network to an end user device; receiving coded data destined to said end user device, which data is coded with a first codec rate, and starting, in response to said detecting, rate transformation for transforming codec rate of said data destined to the end user device into said second codec rate. Also disclosed are an apparatus, a system and a computer program.

33 Claims, 11 Drawing Sheets

A-side AMR mode — 1011

| | 12.2 | 10.2 | 7.95 | 7.4 | 6.7 | 5.9 | 5.15 | 4.75 |
|---|---|---|---|---|---|---|---|---|
| 12.2 | TrFO | | cdc | cdc | cdc | cdc | cdc | cdc |
| 10.2 | | TrFO | | cdc | cdc | cdc | cdc | cdc |
| 7.95 | cdc | | TrFO | | cdc | cdc | cdc | cdc |
| 7.4 | cdc | cdc | | TrFO | | cdc | cdc | cdc |
| 6.7 | cdc | cdc | cdc | | TrFO | | cdc | cdc |
| 5.9 | cdc | cdc | cdc | cdc | | TrFO | | cdc |
| 5.15 | cdc | cdc | cdc | cdc | cdc | | TrFO | |
| 4.75 | cdc | cdc | cdc | cdc | cdc | cdc | | TrFO |

(B-side AMR mode on vertical axis; 1012 points to 7.95/4.75 cell "cdc")

Fig. 10A

A-side AMR mode — 1003

| | 12.2 | 10.2 | 7.95 | 7.4 | 6.7 | 5.9 | 5.15 | 4.75 |
|---|---|---|---|---|---|---|---|---|
| 12.2 | TrFO | tc | tc | tc | tc | tc | tc | tc |
| 10.2 | TrFO | TrFO | tc | tc | tc | tc | tc | tc |
| 7.95 | TrFO | TrFO | TrFO | tc | cdc | cdc | cdc | cdc |
| 7.4 | TrFO | TrFO | TrFO | TrFO | cdc | cdc | cdc | cdc |
| 6.7 | TrFO | TrFO | TrFO | TrFO | TrFO | cdc | cdc | cdc |
| 5.9 | TrFO | TrFO | TrFO | TrFO | TrFO | TrFO | cdc | cdc |
| 5.15 | TrFO | TrFO | TrFO | TrFO | TrFO | TrFO | TrFO | cdc |
| 4.75 | TrFO | TrFO | TrFO | TrFO | TrFO | TrFO | TrFO | TrFO |

(1001 → row 12.2; 1002 → row 10.2)

Fig. 10B

SPEECH CODING ARRANGEMENT FOR COMMUNICATION NETWORKS

FIELD OF THE INVENTION

The present invention generally relates to a speech coding arrangement for communication networks.

BACKGROUND OF THE INVENTION

Codecs (encoders/decoders) are used in wireless communication systems to compress speech/voice signals in order to utilize efficiently the expensive bandwidth resources both in the radio interface and in the transmission networks. At the same time, transcoding of voice signals may significantly degrade signal quality and therefore unnecessary transcoding should be avoided.

In a conventional call configuration between wireless user terminals the speech signal is first encoded in the originating user terminal, sent over the radio interface, converted to PCM (Pulse Code Modulated) coded signal (e.g. A-law or µ-law ITU-T Recommendation G.711) in a local transcoder, carried over a fixed transmission network, transcoded again in a distant transcoder, sent over a distant radio interface and finally decoded in the terminating user terminal. In this configuration, the two speech codecs are in so called tandem operation, which may cause degradation in speech quality due to multiple transcodings.

This conventional configuration is illustrated in FIG. 1, which shows a system comprising two interconnected networks, network A 101 and network B 102. Both networks comprise a transcoding function 105 and 106. Further user terminals 103 and 104 are connected to the networks A and B respectively. Messaging line 107 illustrates the conventional encoding/decoding, which takes place in different parts of the system.

For avoiding the double coding and decoding of voice signals by intermediate network elements, methods called Tandem Free Operation (TFO) and Transcoder Free Operation (TrFO) have been introduced. The principle in TFO and TrFO is to transmit compressed signal, which is encoded in a user terminal, as such in a fixed transmission network, whereby transcoding in the transmission network may be avoided. When the originating user terminal and terminating user terminal are using/can use the same speech codec or codec mode, these techniques make it possible to transparently transmit the speech frames received from the originating user terminal to the terminating user terminal without activating the transcoding functions in the originating and terminating networks. This is illustrated in FIG. 1 with messaging line 108. The details of TFO and TrFO are slightly different, but the principle is the same in both methods.

TFO and TrFO allow changing of codec mode used in the associated user terminals, if the situation in the radio interface of one or the other end requires that. It however may take end-to-end round trip amount of time before the change in the codec mode is effected. Thus there may be considerable delay, which may have an effect on signal/speech quality. For example fast degradation of radio interface may cause bad frames and thereby degradation in speech quality until codec mode will be changed to one that is suitable for the degraded radio interface. The delay in effecting a codec mode change in connection with TrFO and TFO is illustrated in messaging diagrams of FIGS. 2 and 3 respectively.

In FIG. 2, UE_B (User Equipment) first transmits with codec mode X 2-1 to UE_A. Then UE_A sends to RNC_A (Radio Network Controller) a measurement report 2-2 indicating a situation in which there is a need to change codec mode in downlink radio connection of UE_A. (This measurement report may have been requested by the RNC_A.) In phase 2-3, RNC_A performs rate control on the basis of the measurement report 2-2. RNC_A sends rate control information 2-4 to RNC_B, which then performs measurement of uplink radio connection of UE_B in phase 2-5. In phase 2-6 RNC_B performs rate control on the basis of the rate control information 2-4 received from RNC_A and measurements performed in phase 2-5. RNC_B sends the maximum rate found out as a result of rate control 2-7 to UE_B. Then UE_B is able to send speech frames to UE_A with codec mode Y 2-8.

Arrow 200 illustrates the delay in effecting the codec mode change in this arrangement. This delay may be for example 450 ms or even more in TrFO between 3G (3rd generation mobile phone) terminals.

In FIG. 3, MS_B (Mobile Station) initially sends speech frames with 12.2 kbits/s AMR (Adaptive Multi Rate) to MS_A (not shown in figure). MS_A detects need to lower the codec rate in downlink radio connection of MS_A to 7.4 kbit/s and sends a downlink codec mode request (DL CMR) 3-1 to a transcoder_A/MGW_A (Media Gateway). A TFO functionality in the transcoder_A/MGW_A forwards the DL CMR 3-2 to a TFO functionality in a transcoder_B/MGW_B, which forwards the DL CMR 3-3 to a decoder in MS_B. The decoder in MS_B forwards the DL CMR 3-4 to an encoder in MS_B. After receiving the DL CMR 3-4 the encoder in MS_B is able to change the coded mode used in sending speech frames to MS_A to 7.4 kbit/s AMR 3-5, which is sent to an decoder in the transcoder_B/MGW_B, forwarded to an encoder in the transcoder_A/MGW_A 3-6 and to a decoder in MS_A 3-7.

Arrow 300 illustrates the delay in effecting the codec mode change in this arrangement. This delay may be for example over 1 s or even more in TFO between GSM terminals.

Hence, there is a need to further develop speech coding arrangements in communication networks.

SUMMARY

According to a first aspect of the invention there is provided a method in a network element of a communication network, which communication network is capable of transparently transferring coded data at least in some part of the communication network, the method comprising:

detecting a need to change codec rate to a second codec rate in a downlink connection from the communication network to an end user device;

receiving coded data destined to said end user device, which data is coded with a first codec rate, and starting, in response to said detecting, rate transformation for transforming codec rate of said data destined to the end user device into said second codec rate.

It is possible that in the downlink there is a need to change the codec rate from the first codec rate to the second codec rate, but alternatively there may be a need to change the codec rate from some other codec rate to the second codec rate.

The rate transformation may be performed by means of coded domain conversion and/or transcoding and it may further comprise adding redundancy.

In an embodiment of the invention the coded domain conversion comprises at least partially decoding said data encoded with said first codec rate for obtaining at least partially decoded data, and using said at least partially decoded data for performing the coded domain conversion.

The detecting a need to change codec rate may be based on for example one or more of the following: measurements, a command to change codec rate and a command to start rate transformation.

In an embodiment of the invention the method further comprises conditionally deciding, whether to start said rate transformation in a particular situation. The decision may be conducted on the basis of one or more of the following: characteristics of available rate transformation mechanisms, subjective/objective speech quality improvement obtainable by said rate transformation, said first codec rate and said second codec rate. With regard to using the first and the second codec rate one may use in practice for example combination of the first and second codec rate or the relationship between them.

In another embodiment of the invention the method further comprises conditionally deciding, which rate transformation mechanism to use in a particular situation. The decision may be conducted on the basis of one or more of the following: characteristics of available rate transformation mechanisms, subjective/objective speech quality improvement obtainable by different rate transformation mechanisms, said first codec rate and said second codec rate.

In an embodiment of the invention the method further comprises
receiving second coded data destined to said end user device, which second coded data is coded with said second codec rate, and
stopping said rate transformation in response to receiving said second coded data.

In another embodiment of the invention the method further comprises
receiving a stop command, and
stopping said rate transformation in response to said stop command.

In an embodiment of the invention said transparent transferring of coded data in the communication network is effected by means of tandem free operation and/or transcoder free operation mechanisms and said first codec rate has been agreed according to tandem free operation and/or transcoder free operation mechanisms.

According to a second aspect of the invention there is provided an apparatus for use in a communication network, which communication network is capable of transparently transferring coded data at least in some part of the communication network, the apparatus comprising:
a receiver configured to receive coded data destined to said end user device, which data is coded with a first codec rate; and
a processing unit configured to detect a need to change codec rate to a second codec rate in a downlink connection from the communication network to the end user device, and to start, in response to said detecting, rate transformation for transforming codec rate of said data destined to the end user device into said second codec rate.

The apparatus may be for example one of the following or some other suitable network element: a media gateway element, a radio network controller, a base transceiver station, a base station controller, a transcoder (for example TCSM, transcoder submultiplexer), a network controller (for example a UMA network controller), a WLAN access point, a VoIP gateway, or a digital subscriber line access multiplexer.

According to a third aspect of the invention there is provided a computer program stored in a computer readable medium, the computer program comprising computer executable program code adapted to enable an apparatus to perform the method of the first aspect.

The computer executable program code of the third aspect may consist of program code executable by any one of the following: a multipurpose processor; a microprocessor; an application specific integrated circuit; a digital signal processor; and a master control processor.

According to a fourth aspect of the invention there is provided an apparatus for a communication network, which communication network is capable of transparently transferring coded data at least in some part of the communication network, the apparatus comprising:
means for detecting a need to change codec rate to a second codec rate in a downlink connection from the communication network to an end user device;
means for receiving coded data destined to said end user device, which data is coded with a first codec rate, and
means for starting, in response to said detecting, rate transformation for transforming codec rate of said data destined to the end user device into said second codec rate.

According to a fifth aspect of the invention there is provided a communication network system comprising
network elements configured to transparently transfer coded data at least in some part of the communication network, at least one of the network elements comprising:
a receiver configured to receive coded data destined to an user device, which data is coded with a first codec rate; and
a processing unit configured to detect a need to change codec rate to a second codec rate in a downlink connection from the communication network to the end user device, and to start, in response to said detecting, rate transformation for transforming codec rate of said data destined to the end user device into said second codec rate.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which:

FIG. 10A shows a decision table according to an embodiment of the invention;

FIG. 10B shows a decision table according to another embodiment of the invention;

DETAILED SPECIFICATION

Figure 1:
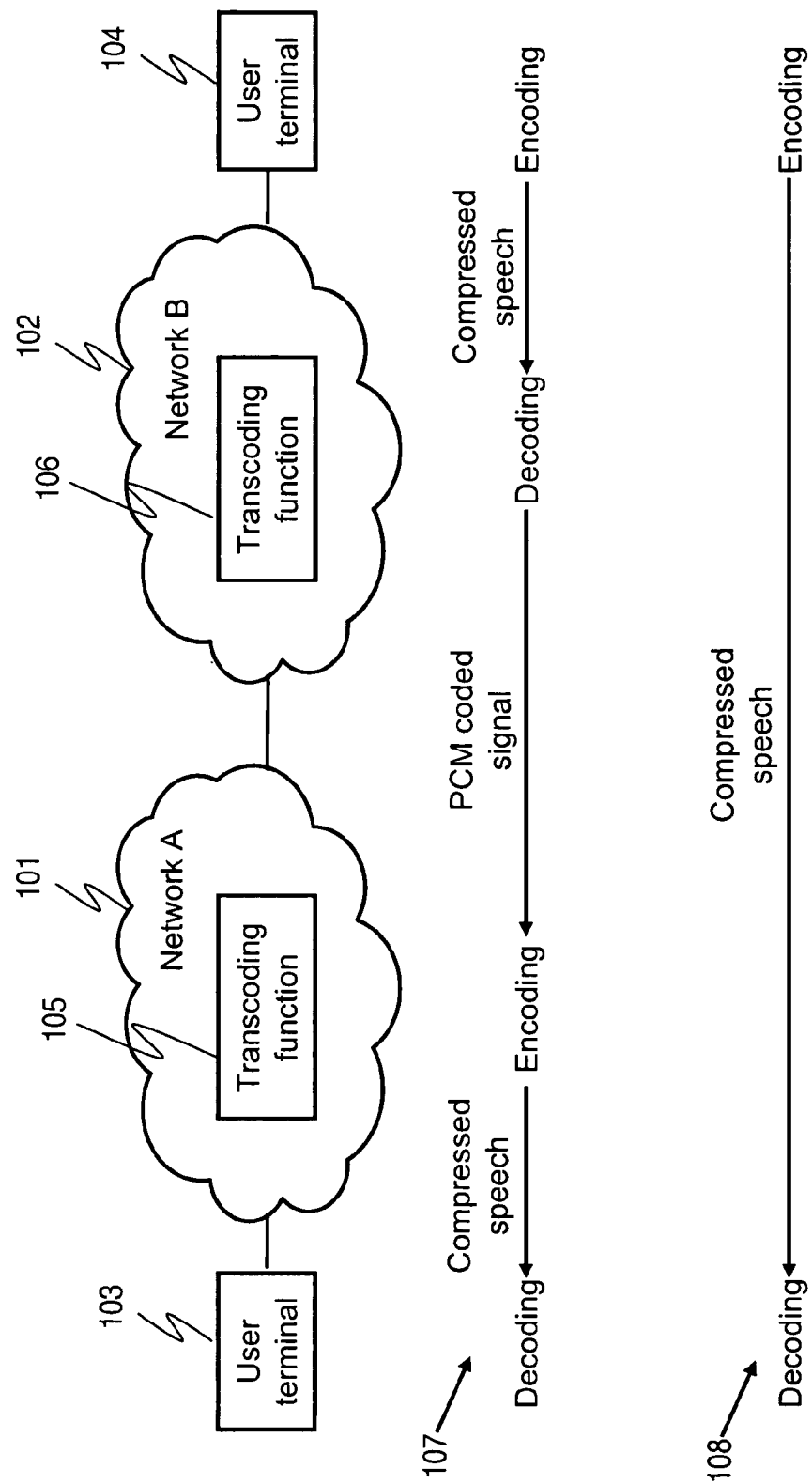
FIG. 1 shows an example of a prior art system.

In the following like reference numbers are used to refer to like elements.

Some examples of embodiments of the invention are described below in connection with TFO and/or TrFO implementations. Both TFO and TrFO generally provide transparent transmission of compressed speech through transmission networks. The main difference between TFO and TrFO is that in TrFO transcoder units in network are bypassed, but TFO is fully handled and terminated in the transcoder units and therefore the transcoder units cannot be bypassed in TFO. It should be appreciated that in addition to TFO and TrFO, the invention may as well be applied to some other technology providing transparent transmission of compressed speech through transmission networks or some parts of transmission networks. Furthermore the invention may be used in the context of an end-to-end TFO/TrFO type of connection or in a transcoder at the edge type of arrangement, wherein TFO/TrFO is applied only in some part of the end-to-end connection.

Embodiments of the invention may be used in the context of any suitable network technology or combination of two or more network technologies. The network may have a radio interface or a fixed line interface for end user devices. Such interface may be for example a 2G (second generation mobile network), 3G (third generation mobile network), Bluetooth, or WLAN interface and the interface may use packet data or circuit switched data. Additionally the network may employ VoIP protocol. For example the following environments may be suitable for using the invention: 2G-2G TFO, 3G-3G TrFO, 2G-3G TFO/TrFO, 3G-UMA (Unlicenced Mobile Access) TFO/TrFO, 3G-VoIP TFO/TrFO, 3G-PSTN Transcoder at the edge and so forth.

The terms user terminal, wireless user terminal, mobile station (MS) and user equipment (UE) are used interchangeably in this document. These terms are used to refer in general to an apparatus having communication capabilities.

The term rate transformation is used to refer to a procedure, which may be accomplished for example by means of coded domain conversion or transcoding. Various embodiments of the invention may apply coded domain conversion or transcoding or both of them. For defining a difference between coded domain conversion and transcoding one may consider a case where speech encoded with encoder A needs to be transcoded so that decoder B can decode it. Transcoding may be performed via signal level by first decoding the signal (using "decoder A") and then encoding it (using "encoder B") and then decoding it with decoder B. In coded domain conversion the transcoding is carried out on coded domain i.e. based on the coded parameters without going to the signal level in-between. In this way the encoded parameters (encoded with encoder A) may be manipulated into parameters that can be decoded by decoder B. Additionally or alternatively the coded domain conversion may be performed by partially or fully decoding the data encoded by the encoder A and using this partially or fully decoded data to perform the coded domain parameter manipulation of codec parameters A to codec parameters B.

As an alternative to or in addition to the transcoding or coded domain conversion also adding redundancy may be employed in the rate transformation procedure. An example relating to adding redundancy is further discussed below in connection with FIG. 9.

In some embodiments of the invention the rate transformation procedure may comprise speech enhancement procedures as well. For example CDALC (Coded Domain Automatic Level Control), noise suppression, acoustic echo cancelling etc. may be used. The enhancements may be carried out in coded domain or signal level.

Figure 4:
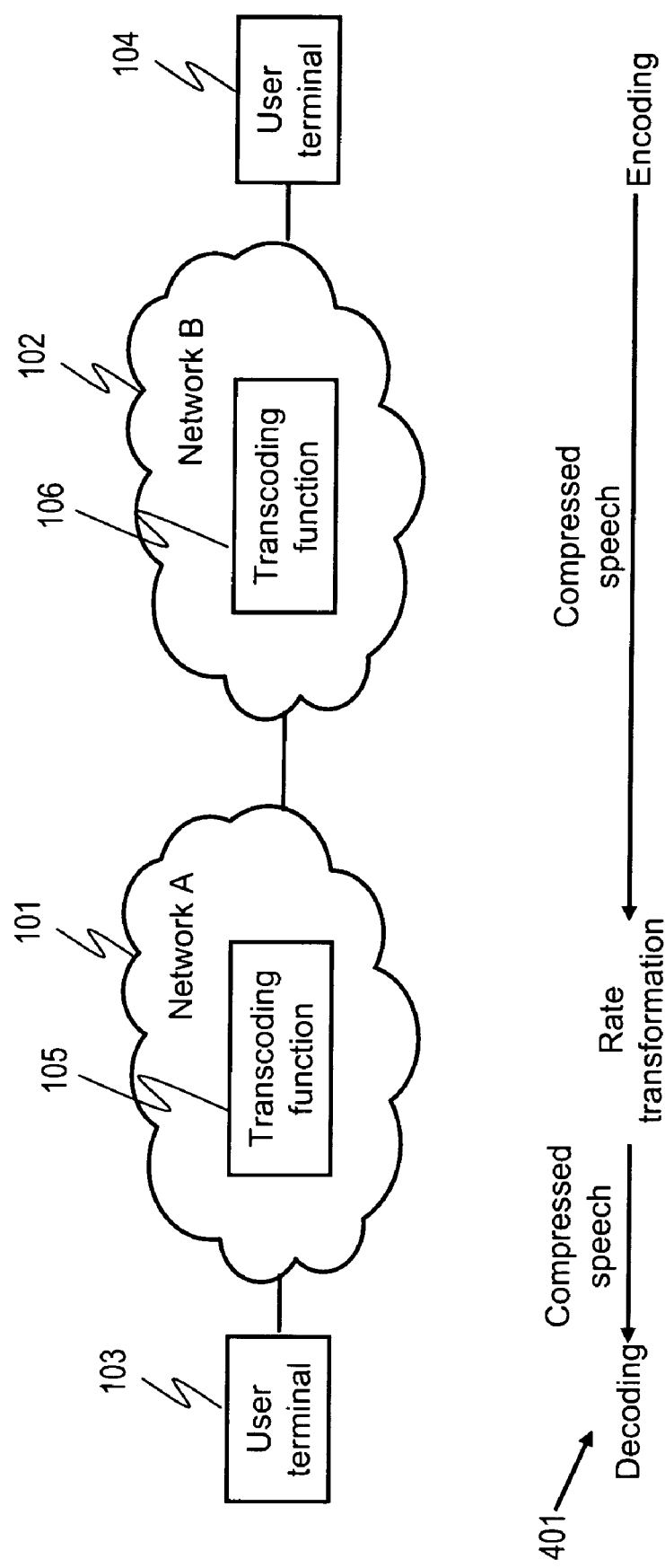
FIG. 4 shows an example of a system according to an embodiment of the invention.

FIG. 4 shows an example of a system according to an embodiment of the invention comprising two interconnected networks, network A 101 and network B 102. Both networks comprise a transcoding function 105 and 106. It should be noted that in addition to different networks, the networks A and B may be subnetworks of the same network or simply different parts of the same network. Further the system comprises user terminals 103 and 104, which are connected to the networks A and B respectively. Messaging line 401 illustrates the encoding/decoding/rate transformation, which takes place in different parts of the system according to some embodiments of the invention.

Figure 5:
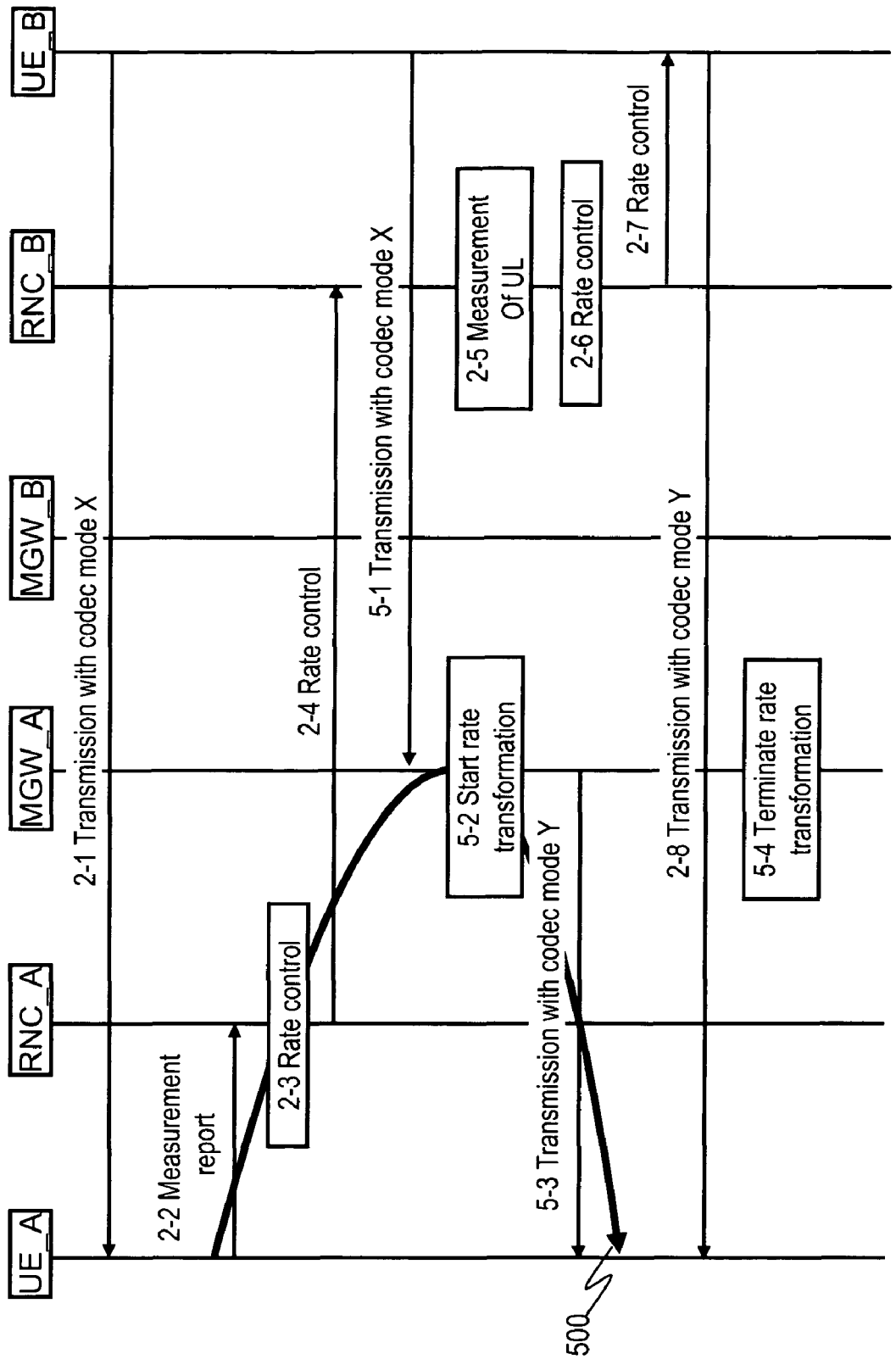
FIG. 5 shows a diagram illustrating messaging according to an embodiment of the invention.

FIG. 5 shows a diagram illustrating messaging according to an embodiment of the invention. Therein UE_B first transmits with codec mode X 2-1 to UE_A. Then UE_A sends to RNC_A (Radio Network Controller) a measurement report 2-2 indicating a situation in which there is a need to change codec mode in downlink radio connection of UE_A. (This measurement report may have been requested by the RNC_A.) In phase 2-3, RNC_A performs rate control on the basis of the measurement report 2-2. RNC_A sends rate control information 2-4 to RNC_B, which then performs measurement of uplink radio connection of UE_B in phase 2-5.

MGW_A notices the rate control information 2-4 sent between RNC_A and RNC_B. UE_B continues to send speech frames with codec mode X 5-1 (before codec mode change of TrFO reaches UE_B). MGW_A intercepts such transmission and starts rate transformation in phase 5-2. The rate transformation in MGW_A may be performed for example by means of coded domain conversion or transcoding. As a result of the rate transformation 5-2, the speech frames are forwarded to UE_A with codec mode Y 5-3.

At the same time RNC_B continues with the normal codec mode change of TrFO and performs in phase 2-6 rate control on the basis of the rate control information 2-4 received from RNC_A and measurements performed in phase 2-5. RNC_B sends the maximum rate found out as a result of rate control 2-7 to UE_B. Then UE_B is able to send speech frames to UE_A with codec mode Y 2-8. When MGW_A notices that UE_B is sending with codec mode Y, it terminates the rate transformation in phase 5-4.

Figure 2:
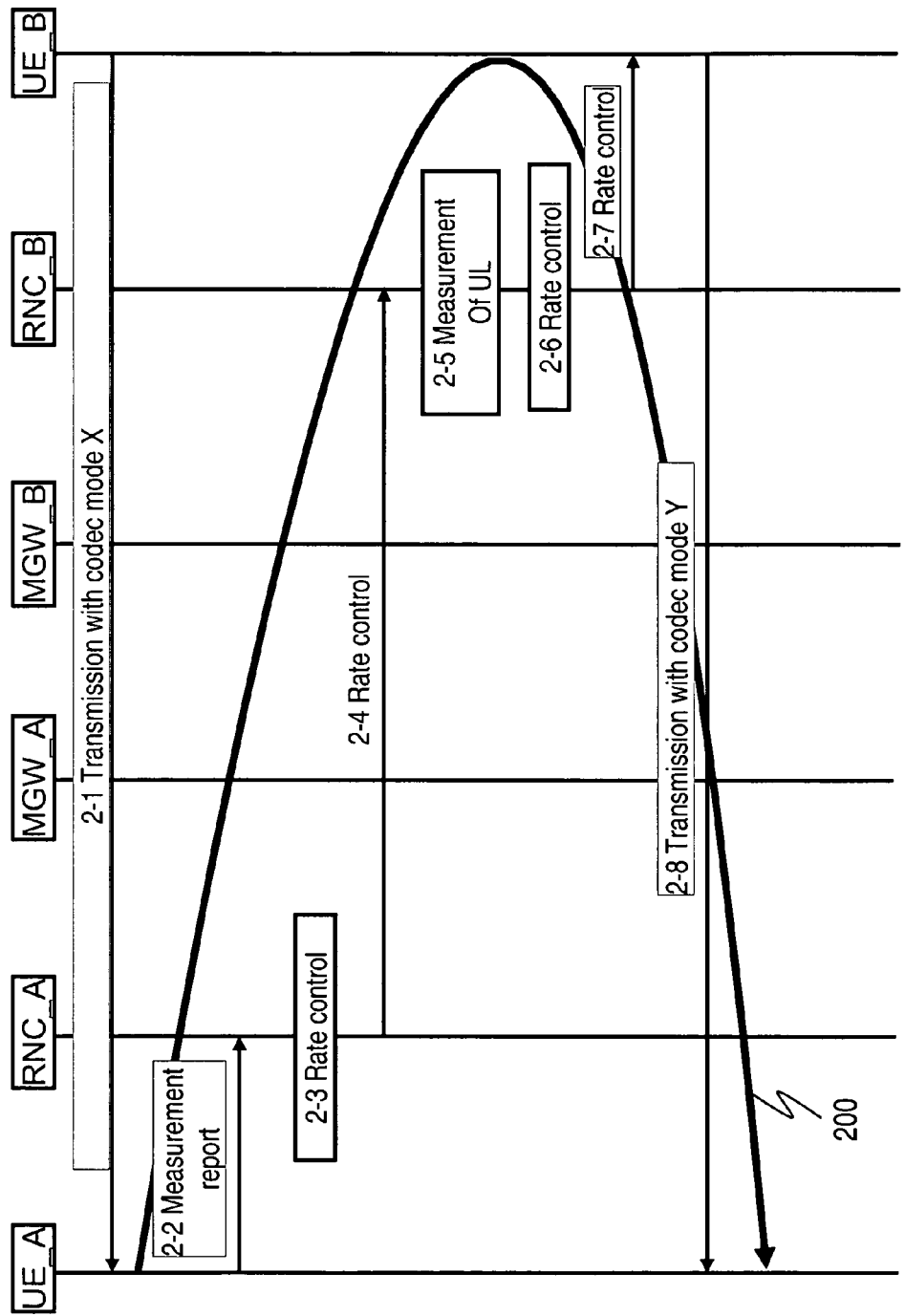
FIG. 2 shows a diagram illustrating messaging according to prior art.

Arrow 500 illustrates the delay in effecting the codec mode change in the arrangement of FIG. 5. When compared to delay illustrated in corresponding prior art arrangement of FIG. 2 it can be noted that the delay in this arrangement is shorter.

Figure 6:
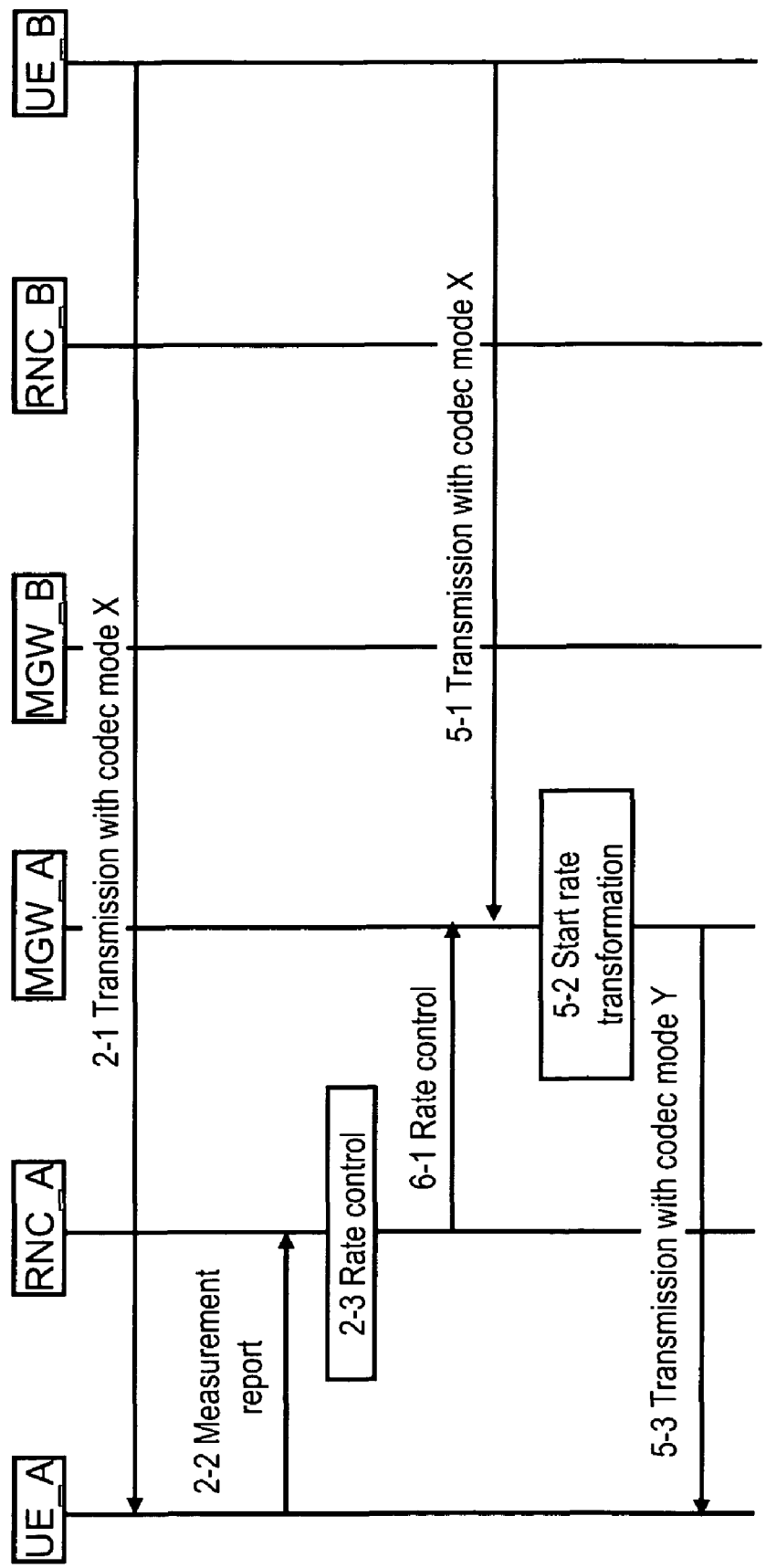
FIG. 6 shows another diagram illustrating messaging according to an embodiment of the invention.

FIG. 6 shows another diagram illustrating messaging according to an embodiment of the invention. Until rate control 2-3 performed in RNC_A the messaging in FIG. 6 is equal to the messaging in FIG. 5, but now rate control information 6-1 is sent only to MGW_A and not all the way to RNC_B. This may be accomplished for example such that MGW_A simply captures the rate control information received from RNC_A and does not send it forward to RNC_B. In other words only rate transformation is initiated and the change of codec mode according to TrFO is not. This may be beneficial for example in an environment, where data rate needs to be changed only for a relatively short period of time (due to relatively fast changes in radio interface quality for example) and not for a longer period of time. Herein one should note that in such environment, the achieved downlink codec mode in prior art arrangements may not always be totally suitable for the radio interface due to the long delay in the codec mode change. The embodiment of FIG. 6 may also be beneficial for example in a situation where one wants to save transmission/processing capacity on the B-side. After this, messaging in FIG. 6 continues in a similar manner as in FIG. 5: UE_B continues to send speech frames with codec mode X 5-1, MGW_A intercepts such transmission and starts rate transformation in phase 5-2. Also here the rate transformation in MGW_A may be performed for example by means of coded domain conversion or transcoding. As a result of the rate transformation 5-2, the speech frames are forwarded to UE_A with codec mode Y 5-3.

Rate transformation in MGW_A may be continued for example until rate used by UE_B appears to match the rate suited for the radio interface of UE_A. The reason for such situation to emerge may be for example that UE_B changes the rate it uses for any reason or that the characteristics of the radio interface of UE_A change such that the rate used by UE_B is again suitable. Rate transformation in MGW_A may be terminated also due to a command to do so. For example RNC_A may send such command, for example on the basis of some measurements or time.

Figure 3:
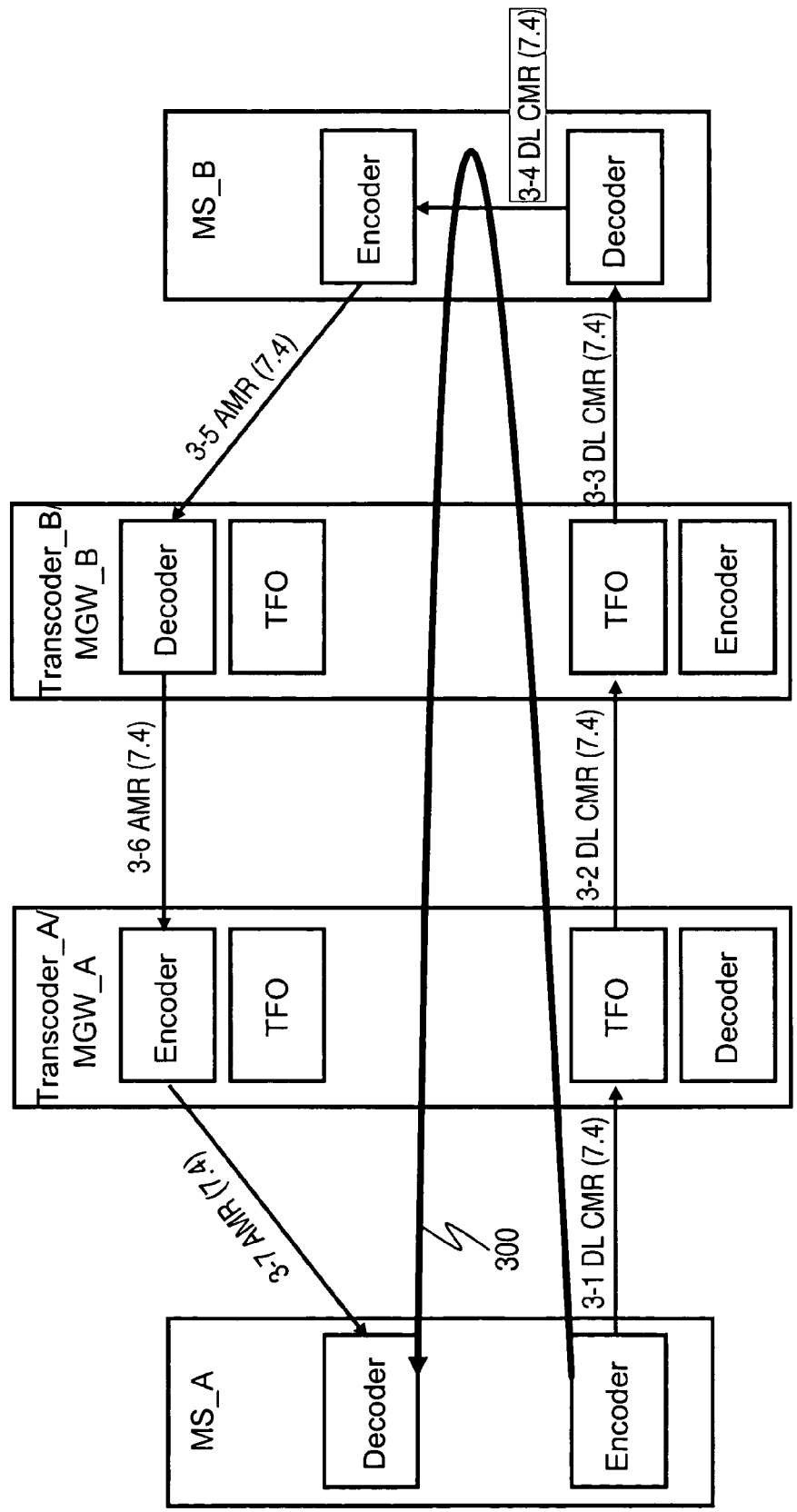
FIG. 3 shows another diagram illustrating messaging according to prior art.
Figure 7:
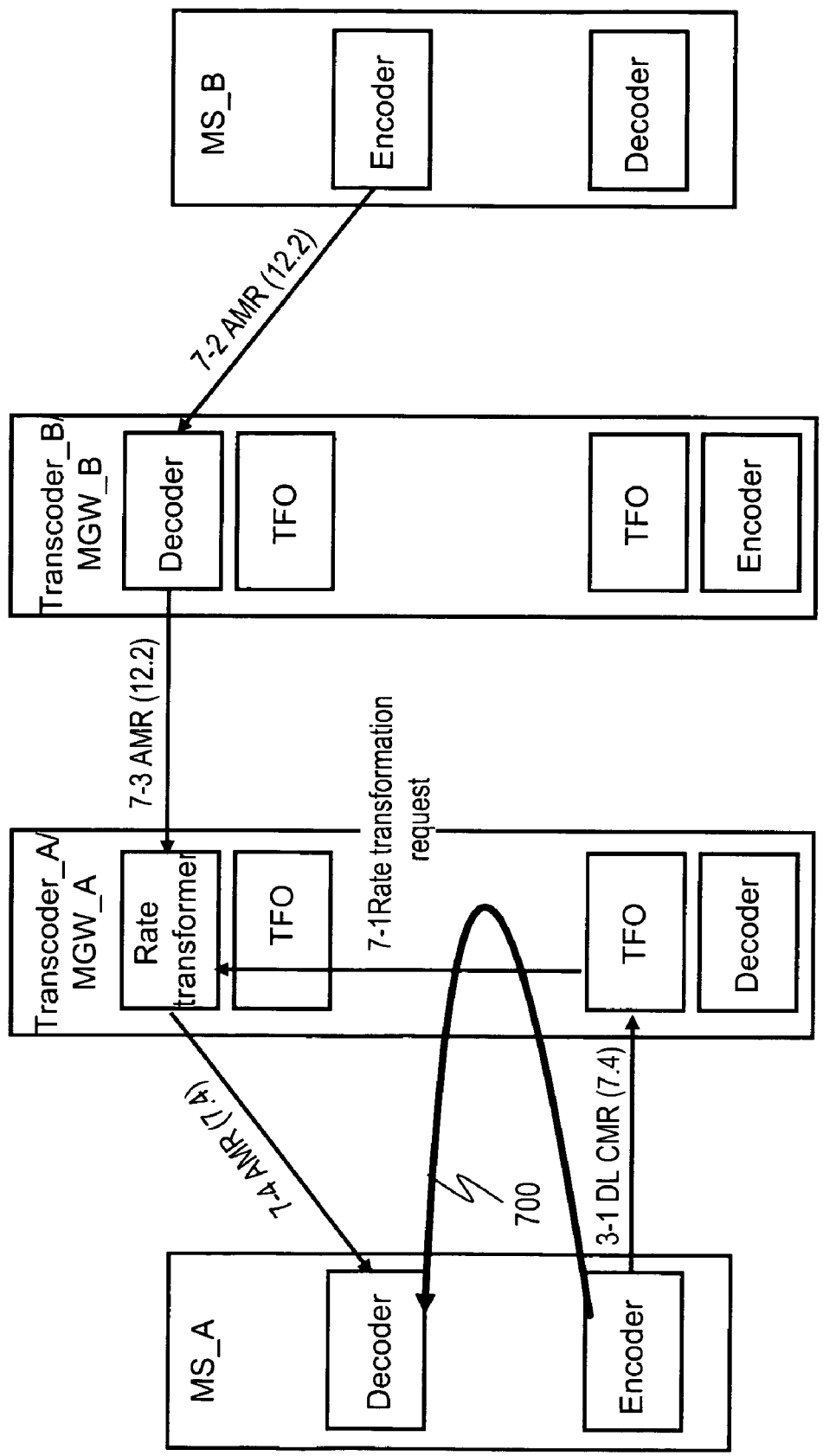
FIG. 7 shows yet another diagram illustrating messaging according to an embodiment of the invention.

FIG. 7 shows yet another diagram illustrating messaging according to an embodiment of the invention. Therein MS_B (Mobile Station) initially sends speech frames with 12.2 kbits/s AMR to MS_A (these messages are not shown in figure). MS_A detects a need to lower the codec rate in downlink radio connection to 7.4 kbit/s and sends a downlink codec mode request (DL CMR) 3-1 to a transcoder_A/MGW_A. In response to the DL CMR, a TFO functionality in the transcoder_A/MGW_A forwards a rate transformation request 7-1 to a rate transforming functionality in the transcoder_A/MGW_A. In addition to that the TFO functionality in the transcoder_A/MGW_A may also forward the DL CMR to TFO functionality in a transcoder_B/MGW_B the same way as in FIG. 3 in order to have the rate change according to TFO completed, but this option is not shown here.

In the example of FIG. 7, MS_B continues to send speech frames with 12.2 kbits/s AMR 7-2. A decoder in a transcoder_B/MGW_B forwards the 12.2 kbit/s AMR 7-3 to the rate transforming functionality in the transcoder_A/MGW_A. The rate transforming functionality transforms rate of the 12.2 kbit/s AMR to 7.4 kbit/s AMR as requested and sends the 7.4 kbit/s AMR signal to decoder in MS_A. The rate transformation in the rate transforming functionality may be performed for example by means of coded domain conversion or transcoding. It should be noted that, if the rate change of TFO were used in parallel with the shown method, the rate change would eventually reach MS_B and after that the rate transforming functionality in the transcoder_A/MGW_A may terminate the rate transformation.

Arrow 700 illustrates the delay in effecting the codec mode change in the arrangement of FIG. 7. When compared to delay illustrated in corresponding prior art arrangement of FIG. 3 it can be noted that the delay in this arrangement is shorter.

Figure 8:
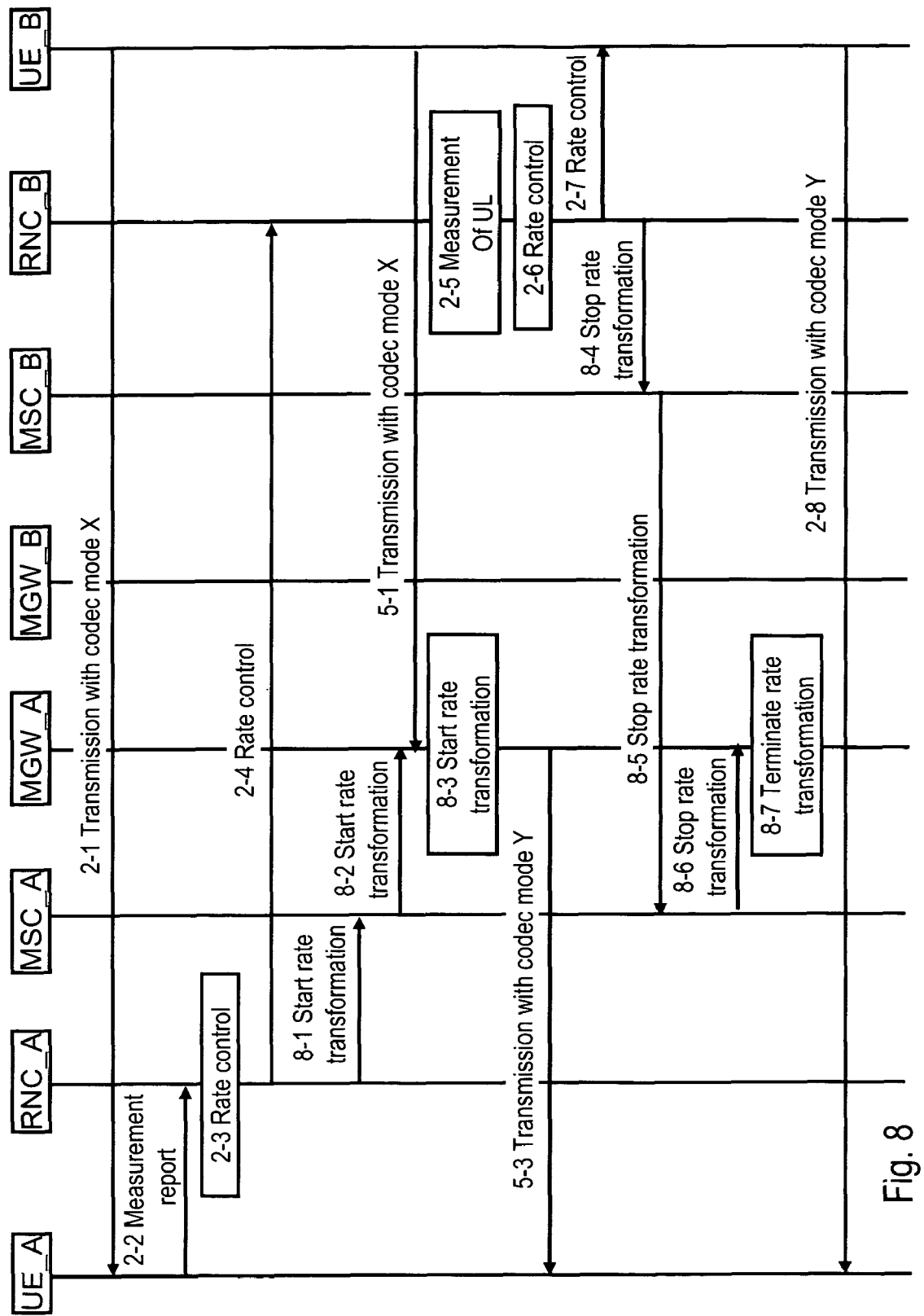
FIG. 8 shows yet another diagram illustrating messaging according to an embodiment of the invention.

In some implementations it is possible that the MGW_A of FIG. 5 may not be able to associate the rate control information 2-4 sent by RNC_A into the same context with the speech frames 5-1 transmitted by UE_B. In such situation signaling from both RNC_A and RNC_B may be used for starting and stopping the rate transformation. FIG. 8 shows a diagram illustrating messaging according to such embodiment of the invention. Also here UE_B initially transmits with codec mode X 2-1 to UE_A. Then UE_A sends to RNC_A a measurement report 2-2 indicating a situation in which there is a need to change codec mode in downlink radio connection of UE_A. In phase 2-3, RNC_A performs rate control on the basis of the measurement report 2-2 and sends rate control information 2-4 to RNC_B.

In connection with sending the rate control information 2-4, RNC_A also sends a command to start rate transformation 8-1 to MSC_A (Mobile Switching Centre), which forwards the command 8-2 to MGW_A. Then, when UE_B continues to send speech frames with codec mode X 5-1, MGW_A knows on the basis of the command 8-2 to intercept such transmission and start rate transformation in phase 8-3. As a result of the rate transformation 8-3, the speech frames are forwarded to UE_A with codec mode Y 5-3.

Like in FIG. 5, RNC_B continues at the same time with the normal codec mode change of TrFO and performs measurement of uplink radio connection of UE_B in phase 2-5 and rate control in phase 2-6. RNC_B sends the maximum rate found out as a result of rate control 2-7 to UE_B. Then UE_B is able to send speech frames to UE_A with codec mode Y 2-8. In connection with sending the rate control information 2-7 to UE_B, RNC_B also sends a command to stop rate transformation 8-4 to MSC_B, which forwards the command 8-5 to MSC_A, from where the command 8-6 is forwarded to MGW_A. Then MGW_A knows on the basis of the command 8-6 to terminate the rate transformation in phase 8-7.

The signaling used for starting and stopping rate transformation in FIG. 8 may employ for example RANAP (Radio Access Network Application Part), H.248 and/or BICC (Bearer Independent Call Control) messages. For example messages between RNCs and MSCs may be RANAP messages, messages between MSCs and MGWs may be H.248 messages and messages between MSCs may be BICC messages. It should however be appreciated that also some other type of signaling may be used in connection with embodiments of the invention.

Figure 9:
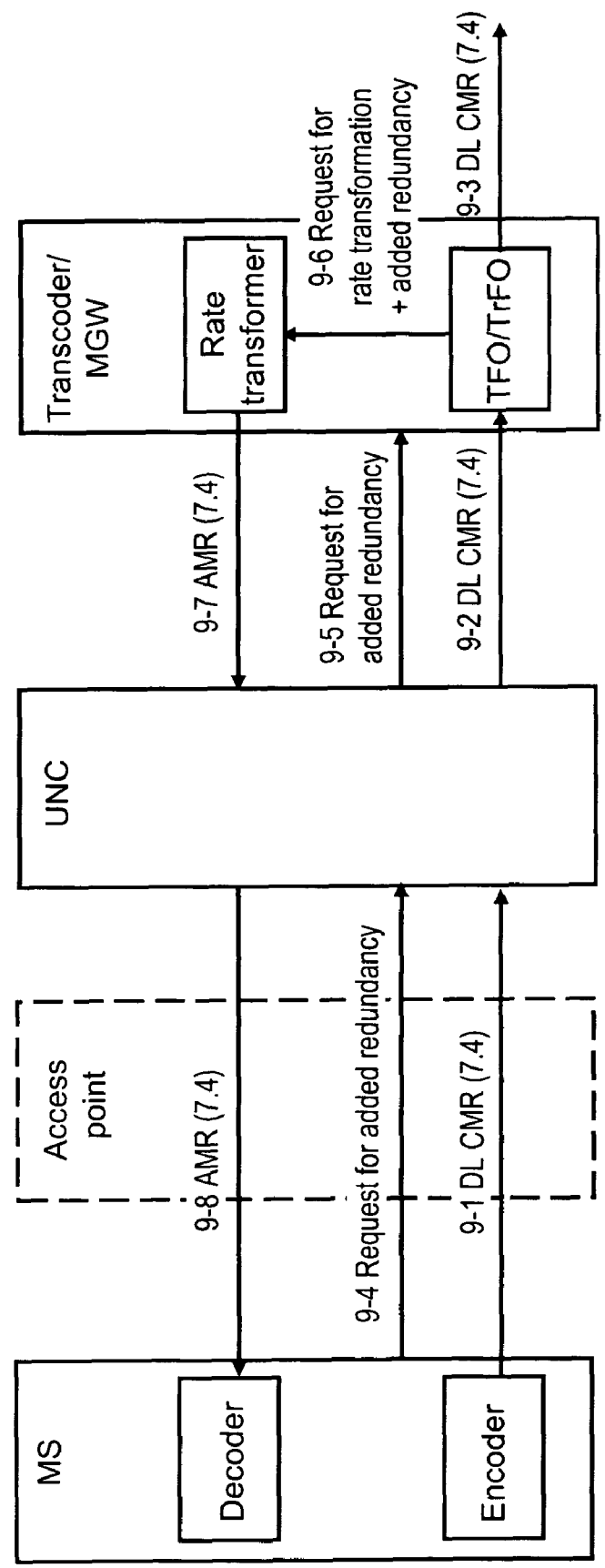
FIG. 9 shows yet another diagram illustrating messaging according to an embodiment of the invention.

FIG. 9 shows yet another diagram illustrating messaging according to an embodiment of the invention. The shown example relates to a UMA implementation, wherein MS connects to a mobile network through a standard access point (for example 802.11 or Bluetooth) and UNC (UMA Network Controller).

MS initially receives speech frames for example with 12.2 kbits/s AMR (these messages are not shown in figure). Then MS detects a need to lower the codec rate in downlink radio connection to 7.4 kbit/s and sends a downlink codec mode request (DL CMR) 9-1, 9-2 via a UNC element to a transcoder/MGW of a mobile network. The TFO/TrFO functionality in the transcoder/MGW may forward the DL CMR 9-3 to the other communicating side in order to have rate change according to TFO/TrFO completed but this is not mandatory.

MS sends also a request 9-4, 9-5 to have added redundancy via UNC to the transcoder/MGW. The request may be an explicit request, which is sent when redundancy is needed, or MS may send redundancy configuration information comprising a preferred redundancy mode for each supported codec mode. In the later case the transcoder/MGW knows on the basis of the requested codec mode, which redundancy mode is preferred, whereby separate request for redundancy may be unnecessary.

In response to the DL CMR, a TFO/TrFO functionality in the transcoder/MGW forwards a rate transformation request 9-6 to a rate transforming functionality in the transcoder/MGW. The rate transformation request comprises also request to add redundancy. Then as the other communicating side continues to send speech frames with 12.2 kbits/s AMR, the rate transforming functionality in the transcoder/MGW transforms rate of the 12.2 kbit/s AMR to 7.4 kbit/s AMR as requested and sends the 7.4 kbit/s AMR signal 9-7, 9-8 via UNC to a decoder in MS. The rate transformation in the rate transforming functionality may be performed for example by means of coded domain conversion or transcoding. Additionally the rate transformation functionality adds redundancy to the speech frames sent to MS for example by sending each speech frame twice.

In a similar way redundancy may be added also in some other embodiments of the invention, for example in connection with VoIP configurations. Additionally in some embodiments, adding redundancy may be an alternative to transcoding and coded domain conversion.

Some embodiments of the invention may be useful in a 3G-GSM TFO case where there is link adaptation applied on the GSM side. In such case the GSM side may be producing CMR's relatively frequently, for example on 40 ms interval. The CMRs are transmitted to the 3G side as rate control messages. Now the RNC on the 3G side may filter out some of the rate control messages, if there are too many such messages being sent, whereby no rate change according to TFO/TrFO is effected for each CMR. Sending frequent CMRs and rate control messages also takes up bandwidth and processing power and may therefore be undesirable. Also due to the long round trip delay before rate change according to TFO/TrFO is effected and in use in the downlink of the GSM side, the radio conditions of the GSM side may have already changed. Thus it may be useful in this case to stop using rate changes according to TFO/TrFO and instead to perform the transformation of some embodiment of the invention on the GSM side. For example a transcoder in the GSM side may capture the CMR's and not forward them to the 3G side. It could also be decided that, if the frequency of the CMR's/rate control messages is above or below some predefined threshold value (which may be for example 1 CMR per 80 ms or 1 CMR per 1s) the rate transformation according to some embodiment of the invention is started or stopped respectively. Otherwise the connection would be a normal TFO/TrFO connection.

It should be appreciated that in addition to or instead of MGW the rate transformation of various embodiments of the invention may be carried out in some other network element, for example in RNC or BTS.

With regard to rate transformation used in various embodiments of the invention, it may be conditionally decided, whether to start (or stop) the rate transformation or not in a particular situation and whether to use coded domain conversion or transcoding. Such decision may be made in an MGW element and it may be considered for example in phases 5-2, 5-4, 8-3 and 8-7 of FIGS. 5, 6 and 8. Another option is to let RNC make the decision. RNC may make the decision based on number of different measurements and/or any combination of the options discussed below. If RNC makes the decision, it may send information about the decision to the respective MGW for example by sending a suitable RANAP message to a respective MSC, which in turn forwards the message to the MGW by means of a H.248 message. Such additional messaging may be necessary because the rate control information 2-4 of FIGS. 5, 6 and 8 may comprise solely the codec mode selected by the rate control mechanism and not any information for example on quality measurements. It should be appreciated that also some other type of messaging between the RNC and MGW may be used within the context of various embodiments of the invention.

Whether to start rate transformation or not (be it by means of coded domain conversion or transcoding) may be considered a compromise between potential speech quality improvements achieved by reducing the number of bad frames quickly versus possible degradation in speech quality caused by the coded domain conversion or transcoding.

Let's consider a situation in which speech frames are transmitted from a B-side (for example UE_B of FIG. 5, 6 or 8) to an A-side (for example UE_A of FIG. 5, 6 or 8). If the radio link quality on the A-side is increasing instead of decreasing then it may be unnecessary to change the codec mode in the A-side so quickly (as there will not be any bad speech frames caused by the changing radio link quality). In this case the decision on whether to start rate transformation could be based on the quality of the conversion or it may be decided that rate transformation is never used in such situation.

Other aspects that may be taken into account when deciding, whether to start the rate transformation may include the following:

If coded domain conversion between some codec modes is not of good quality, conversion between those rates should not be used.

Only coded domain conversions that do not produce significantly lower speech quality than the TrFO with the B-side codec should be used. This may be codec mode dependent or dependent on the quality of the coded domain conversion.

An additional transcoding step may have a relatively insignificant effect on quality of signal when AMR modes 12.2 kbit/s and 10.2 kbit/s are used on the B-side. Thus if B-side is using AMR mode 12.2 kbit/s or AMR mode 10.2 kbit/s and A-side requests a lower mode, the rate transformation may be conducted by means of transcoding to lower mode. The same may be true for some other codec modes as well, whereby transcoding may be applied to them, too. On the other hand, if B-side is using a lower AMR mode, an additional transcoding step may result in degraded signal.

One approach on whether to use transcoding is to assume that, if A-side is requesting lower mode, taking the lower mode into use quickly will reduce bad frames and thus improve speech quality, even though the additional transcoding step may have an effect on signal quality. Therefore transcoding might be used anyway. Additionally or alternatively it is possible to make a table of "allowed" transcodings, that are known to be of good quality. For example subjective speech quality tests, where the deterioration in user opinion (for example MOS, Mean Opinion Score) is not above some suitable threshold between transcoding/not transcoding, may be used for finding out transcodings that are of good quality. Objective speech quality measurements can be also used for this. It should be noted that information about allowed transcodings may be maintained by some other means than table as well, e.g. some type of rules may be defined for this purpose.

FIGS. 10A and 10B show two examples of decision tables illustrating some options of choosing, which rate transformation type to use in various situations. In the shown examples speech frames are transmitted from a B-side (for example UE_B of FIG. 5, 6 or 8) to an A-side (for example UE_A of FIG. 5, 6 or 8).

In FIG. 10A it is assumed that TrFO between the A-side and the B-side is initially using AMR mode 7.95 kbit/s before the A-side requests rate control. The requested rate is 7.4 kbit/s. The 7.4 kbit/s coded mode is so close to the 7.95 kbit/s mode that using the 7.95 kbit/s mode until the rate control is finished on the B-side and the B-side is sending in the 7.4 kbit/s mode is not likely to cause significantly more bad frames than using the coded domain conversion to 7.4 kbit/s mode. As the coded domain conversion itself may cause some degradation on speech quality and the fact that the modes are almost the same, the conversion will not be started in this case. This is shown in cell 1011 of the table of FIG. 10A.

Whereas, if the A-side is requesting AMR mode 4.75 kbit/s then the coded domain conversion is started as continuing to use the 7.95 kbit/s mode may result in decreased link quality, which may cause many bad frames. Thus applying the 4.75 kbit/s mode as quickly as possible may reduce the number of bad frames and thus improve the speech quality. This is shown in cell 1012 of the table of FIG. 10A. The use of coded domain conversion in connection with other combinations of different codec modes is handled similarly in the table of FIG. 10A.

In FIG. 10B, normal TrFO distributed rate control is applied, if A-side requests a higher mode than it is currently using. This is illustrated in the lower left hand side of the table of FIG. 10B. If B-side is using AMR mode 12.2 kbit/s or 10.2 kbit/s and A-side requests a lower mode, then transcoding is used. This is shown in rows 1001 and 1002 of the table of FIG. 10B. Transcoding is also used, if B-side is using AMR mode 7.95 kbit/s and A-side requests AMR mode 7.4 kbit/s. This is shown in cell 1003 of the table of FIG. 10B. If B-side is using some other AMR mode and A-side requests a lower mode, then coded domain conversion is used. This is illustrated in the lower right hand side of the table of FIG. 10B.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Figure 11:
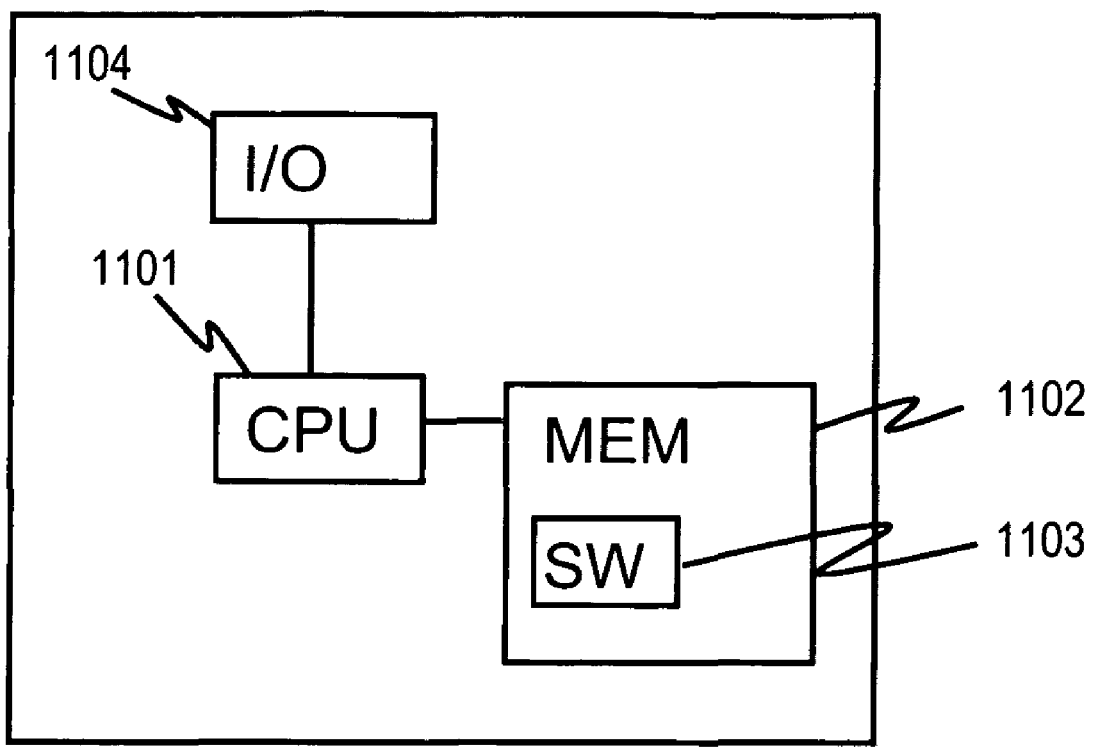
FIG. 11 shows a block diagram of an apparatus suited for carrying out various embodiments of the invention.

FIG. 11 shows a block diagram of an apparatus suited for carrying out various embodiments of the invention. The apparatus 1100 may be a typical computer, such as a general-purpose computer or a server, with possibly distributed functions, that comprises a Central Processing Unit (CPU) 1101 for controlling the computer, a memory 1102 including a computer program code or software 1103.

The software 1103 includes instructions for the CPU 1101 to control the apparatus 1100 such as an operating system and different computer applications. The software 1103 may comprise instructions for controlling the apparatus to provide some functionality of the invention. The instructions may for example control the apparatus to operate as a MGW element according to some embodiments of the invention or to provide a rate transformation functionality according to some embodiments of the invention. The apparatus 1100 further comprises an I/O (input/output) unit 1104 such as a LAN (Local Area Network), Ethernet or WLAN (Wireless LAN) unit. The apparatus 1100 could comprise also a user interface (not shown), but the user interface may be implemented also by means of a remote connection through the I/O unit or the user-interface may be non-existent.

It should be appreciated that in this document, words comprise, include and contain are each used as open-ended expressions with no intended exclusivity. Further it should be appreciated that the order of the various shown or described messages or method steps may be varied and that some steps or messages may be repeated a plurality of times or some of them may be left out from a certain implementation of the invention.

The foregoing description has provided by way of non-limiting examples of particular implementations and embodiments of the invention a full and informative description of the best method and apparatus presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method comprising:
   intercepting, at a network element of a communication network, rate control information sent towards a second end user device of the communication network indicating a need to change a first codec rate to a second codec rate of coded data in a communication received from the second user device in a downlink connection from the communication network to a first end user device;
   receiving, at the network element, coded data from said second end user device destined to said first end user device, which said coded data is coded with the first codec rate;
   starting, at said network element, in response to said intercepted rate control information, rate transformation to transform said data received from said second end user device coded with said first codec rate into said second codec rate in the downlink connection to said first end user device;
   receiving second coded data destined to said first end user device, which said second coded data is coded with said second codec rate; and
   stopping said rate transformation in response to receiving said second coded data.

2. The method according to claim 1, wherein said rate transformation is performed with a coded domain conversion.

3. The method according to claim 2, wherein said coded domain conversion comprises
   at least partially decoding said data encoded with said first codec rate for obtaining at least partially decoded data, and
   using said at least partially decoded data for performing the coded domain conversion.

4. The method according to claim 1, wherein said rate transformation is performed with a transcoder.

5. The method according to claim 1, wherein said rate transformation comprises adding redundancy.

6. The method according to claim 1, wherein said rate control information comprises at least one of the following: measurements, a command to change codec rate and a command to start rate transformation.

7. The method according to claim 1, wherein the method further comprises
   conditionally deciding, whether to start said rate transformation in a particular situation.

8. The method according to claim 7, wherein said deciding is conducted on the basis of at least one of the following: characteristics of available rate transformation mechanisms, subjective/objective speech quality improvement obtainable by said rate transformation, said first codec rate and said second codec rate.

9. The method according to claim 1, wherein the method further comprises
   conditionally deciding, which rate transformation mechanism to use in a particular situation.

10. The method according to claim 9, wherein said deciding is conducted on the basis of at least one of the following: characteristics of available rate transformation mechanisms, subjective/objective speech quality improvement obtainable by different rate transformation mechanisms, said first codec rate and said second codec rate.

11. The method according to claim 1, comprising
   receiving a stop command, and
   stopping said rate transformation in response to said stop command.

12. The method according to claim 1, wherein the communication network is configured to transparently transfer coded data at least in some part of the communication network between said first end user device and said second end user device and wherein said transparent transferring of coded data is effected by at least one of a tandem free operation and a transcoder free operation mechanism and where said first codec rate has been agreed according to the at least one of the tandem free operation and the transcoder free operation mechanisms.

13. The method according to claim 1 performed by a computer program stored in a computer readable medium and executed by a processor.

14. The method according to claim 1, wherein the rate control information sent towards the second end user device is at least for prompting a codec rate change by the second end user device for the communication.

15. The method according to claim 14, wherein said rate transformation is started before the codec rate change by the second end user device for the communication.

16. An apparatus comprising:
   at least one processor; and
   at least one memory including computer program code, where the at least one memory and the computer program code are configured, with the at least one processor, to cause the apparatus to at least:
      receive coded data from a second end user device destined to a first end user device, which said coded data is coded with a first codec rate;
      intercept rate control information sent towards the second end user device of the communication network indicating a need to change said first codec rate to a second codec rate of coded data in a communication received from the second user device in a downlink connection from the communication network to the first end user device;
      start, at said apparatus, in response to said intercepted rate control information, rate transformation to transform said data received from said second end user device coded with said first codec rate into said second codec rate in the downlink connection to said first end user device;
      receive second coded data from said second end user device destined to said first end user device, which said second coded data is coded with said second codec rate, and
      stop said rate transformation in response to receiving said second coded data.

17. The apparatus according to claim 16, wherein the at least one memory and the computer code is configured with the at least one processor to cause the apparatus to perform said rate transformation by a coded domain conversion.

18. The apparatus according to claim 17, wherein the apparatus at least one memory and the computer code is configured with the at least one processor to cause the apparatus to perform said coded domain conversion by
   at least partially decoding said data encoded with said first codec rate for obtaining at least partially decoded data, and
   using said at least partially decoded data for performing the coded domain conversion.

19. The apparatus according to claim 16, wherein the at least one memory and the computer code is configured with the at least one processor to cause the apparatus to perform said rate transformation by transcoding.

20. The apparatus according to claim 16, wherein the apparatus is caused to add redundancy in connection with said rate transformation.

21. The apparatus according to claim 16, wherein said rate control information comprises at least one of the following: measurements, a command to change codec rate and a command to start rate transformation.

22. The apparatus according to claim 16, wherein the at least one memory and the computer code is configured with the at least one processor to cause the apparatus to conditionally decide, whether to start said rate transformation in a particular situation.

23. The apparatus according to claim 22, wherein the at least one memory and the computer code is configured with the at least one processor to cause the apparatus to perform said deciding on the basis of at least one of the following: characteristics of available rate transformation mechanisms, subjective/objective speech quality improvement obtainable by said rate transformation, said first codec rate and said second codec rate.

24. The apparatus according to claim 16, wherein the at least one memory and the computer code is configured with the at least one processor to cause the apparatus to conditionally decide, which rate transformation mechanism to use in a particular situation.

25. The apparatus according to claim 24, wherein the at least one memory and the computer code is configured with the at least one processor to cause the apparatus to perform said deciding on the basis of at least one of the following: characteristics of available rate transformation mechanisms, subjective/objective speech quality improvement obtainable by different rate transformation mechanisms, said first codec rate and said second codec rate.

26. The apparatus according to claim 16, wherein the at least one memory and the computer code is configured with the at least one processor to cause the apparatus to:
   receive a stop command, and
   stop said rate transformation in response to receiving said stop command.

27. The apparatus according to claim 16, wherein said apparatus is a media gateway element, a radio network controller, a base transceiver station, a base station controller, a transcoder, a network controller, a wireless local area network access point, a voice over internet protocol gateway, or a digital subscriber line access multiplexer.

28. The apparatus according to claim 16, wherein the rate control information sent towards the second end user device is at least for prompting a codec rate change by the second end user device for the communication.

29. The apparatus according to claim 28, wherein said rate transformation is started before the codec rate change by the second end user device for the communication.

30. The apparatus according to claim 16, wherein the at least one memory and the computer code is configured with the at least one processor to cause the apparatus to transparently transfer coded data at least in some part of the communication network between said first end user device and said second end user device and wherein said transparent transferring of coded data is effected by at least one of a tandem free operation and a transcoder free operation mechanism and where said first codec rate has been agreed according to the at least one of the tandem free operation and the transcoder free operation mechanisms.

31. An apparatus comprising:
  means for intercepting, at a network element of a communication network, rate control information sent towards a second end user device of the communication network indicating a need to change a first codec rate to a second codec rate of coded data in a communication received from the second end user device in a downlink connection from the communication network to a first end user device, where the communication network is configured to transparently transfer coded data at least in some part of the communication network between said first end user device and said second end user device;
  means for receiving, at the network element, coded data from said second end user device destined to said first end user device, which data is coded with the first codec rate,
  means for starting, in response to said intercepted rate control information, rate transformation to transform said data received from said second end user device coded with said first codec rate into said second codec rate in the downlink connection to said first end user device,
  means for receiving second coded data destined to said first end user device, which said second coded data is coded with said second codec rate; and
  means for stopping said rate transformation in response to receiving said second coded data.

32. The apparatus according to claim 31, wherein the means for receiving comprises an interface to said communication network and wherein the means for starting and stopping comprises a memory including computer program code, the computer program code executable by at least one processor.

33. A network element comprising:
  a receiver configured to receive coded data from a second end user device destined to a first end user device, which data is coded with a first codec rate;
  a processing unit configured to intercept rate control information sent towards the second end user device of a communication network indicating a need to change said first codec rate to a second codec rate of coded data in a communication received from the second user device in a downlink connection from the communication network to the first end user device, and to start in response to said intercepted rate control information, rate transformation to transform said coded data received from said second end user device coded with said first codec rate into said second codec rate in the downlink connection to said first end user device;
  the receiver further configured to receive second coded data from said second end user device destined to said first end user device, which said second coded data is coded with said second codec rate; and
  the processing unit further configured to stop said rate transformation in response to receiving said second coded data.

* * * * *